(12) United States Patent
Klinger et al.

(10) Patent No.: US 6,907,371 B2
(45) Date of Patent: Jun. 14, 2005

(54) FUEL-LEVEL-DETECTION SYSTEM, CALIBRATION METHOD, AND CALIBRATION SYSTEM

(75) Inventors: Rodney J. Klinger, Fort Wayne, IN (US); James C. Bradley, New Haven, IN (US); Brian P. Marshall, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 10/431,896

(22) Filed: May 8, 2003

(65) Prior Publication Data
US 2004/0225463 A1 Nov. 11, 2004

(51) Int. Cl.[7] .................................................. G01F 1/12
(52) U.S. Cl. ........................................ 702/100; 702/85
(58) Field of Search .............................. 73/1.73, 290 R, 73/291; 137/386; 356/3; 702/33, 50, 55, 85, 100, 108, 116, 127, 155, 158, 159, 166, 189, 198

(56) References Cited

U.S. PATENT DOCUMENTS

| | | | | |
|---|---|---|---|---|
| 4,250,750 A | * | 2/1981 | Martinec et al. | ............... 73/308 |
| 4,535,627 A | * | 8/1985 | Prost et al. | ............... 73/290 B |
| 4,840,056 A | * | 6/1989 | Fernandez et al. | ........... 702/100 |
| 5,251,482 A | * | 10/1993 | Bates et al. | ............... 73/290 V |
| 5,257,090 A | * | 10/1993 | Meinzer et al. | ............. 356/498 |
| 5,379,637 A | * | 1/1995 | Abowd et al. | ............ 73/290 R |
| 5,485,740 A | * | 1/1996 | Lippmann et al. | ........... 73/1.73 |
| 5,752,409 A | * | 5/1998 | Lippmann et al. | ........ 73/290 R |
| 5,947,372 A | * | 9/1999 | Tiernan | ........................ 236/94 |
| 6,335,690 B1 | * | 1/2002 | Konchin et al. | ............ 340/618 |
| 6,363,783 B1 | * | 4/2002 | Turner et al. | ............. 73/290 R |
| 6,484,088 B1 | * | 11/2002 | Reimer | ........................ 701/123 |
| 6,529,845 B1 | * | 3/2003 | Beck, II | ....................... 702/100 |
| 6,597,998 B1 | * | 7/2003 | Gonring | ........................ 702/55 |
| 6,615,656 B1 | * | 9/2003 | Breed et al. | ............... 73/290 R |
| 6,691,025 B2 | * | 2/2004 | Reimer | ........................ 701/123 |

OTHER PUBLICATIONS

Chakravarthy, S; Sharma, R; Kasturi, R; "Noncontact Level Sensing Technique Using Computer Vision"; IEEE Transactions on Instrumentation and Measurement; vol. 51, issue 2; Apr. 2002; pp 353–361.*

* cited by examiner

Primary Examiner—John Barlow
Assistant Examiner—Douglas N Washburn
(74) Attorney, Agent, or Firm—Jeffrey P. Calfa; Dennis Kelly Sullivan; Susan L. Lukasik

(57) ABSTRACT

Systems and methods for calibrating operation of a fuel-level indicator of a vehicle are disclosed. The systems and methods include means of determining and/or receiving configuration information about the vehicle and integrating appropriate logic for converting raw fuel-level signals produced by a fuel-level sensor into appropriate processed fuel-level signals to be received by the fuel-level indicator.

27 Claims, 3 Drawing Sheets

| FUEL HEIGHT TO FUEL VOLUME RELATIONSHIP FOR CYLINDRICAL FUEL TANKS ||
|---|---|
| HEIGHT OF FUEL IN FUEL | VOLUME OF FUEL IN FUEL |
| 5 | 1.9 |
| 10 | 5.3 |
| 15 | 9.4 |
| 20 | 14.1 |
| 25 | 19.6 |
| 30 | 25.3 |
| 35 | 31.1 |
| 40 | 37.4 |
| 45 | 43.9 |
| 50 | 50 |
| 55 | 56.1 |
| 60 | 62.6 |
| 65 | 68.9 |
| 70 | 74.7 |
| 75 | 80.4 |
| 80 | 85.9 |
| 85 | 90.6 |
| 90 | 94.7 |
| 95 | 98.1 |
| 100 | 100 |

FIG. 3

FUEL-LEVEL-DETECTION SYSTEM, CALIBRATION METHOD, AND CALIBRATION SYSTEM

BACKGROUND OF THE INVENTION

The present invention relates to fuel-level-detection systems, methods for calibrating fuel-level detection systems, and systems for calibrating fuel-level detection systems.

DRAWINGS

Other objects and advantages of the invention will become more apparent upon perusal of the detailed description thereof and upon inspection of the drawings in which:

FIG. 3 is a look-up table that lists various heights of fuel in a cylindrical fuel reservoir, which has its longitudinal axis disposed horizontal, and corresponding volumes of fuel in the fuel reservoir.

DETAILS OF INVENTION

Figure 1:
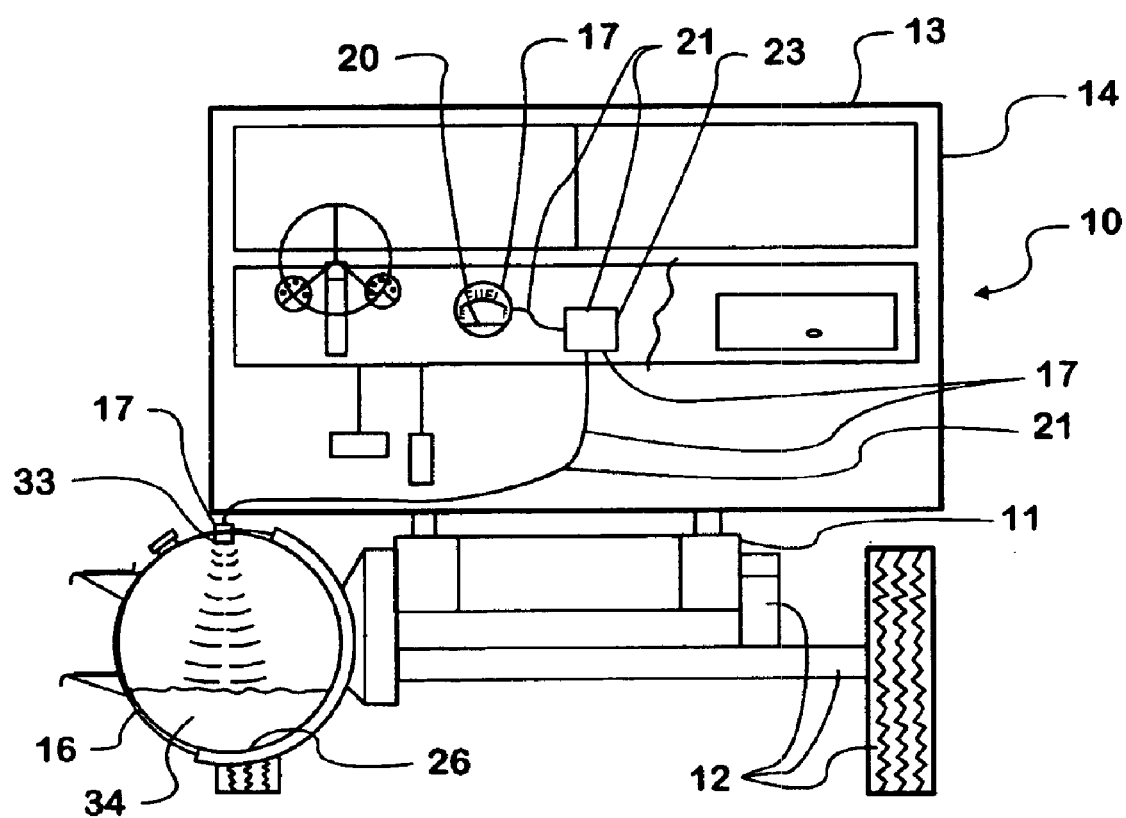
FIG. 1 is a sectional view of a vehicle that the present invention relates to through a plane that intersects the occupant cabin of the vehicle transverse to the longitudinal axis of the vehicle and with a portion of the dash panel cut away.

Referring now to the drawings, the present invention relates to vehicles 10 that have a powerplant (not shown) for driving the vehicle 10 and a fuel reservoir 16 in which fuel 34 for the powerplant (not shown) is stored. Such a vehicle 10 comprises one or more rigid and strong frame structures 11 to which a majority of other components of the vehicle 10 are mounted directly or indirectly and from which a majority of other components of the vehicle 10 derive support directly or indirectly. Such vehicles 10 also include a suspension system 12 that is engaged to and supports the frame structures 11 of the vehicle 10 above the ground and which provides the vehicle 10 with a relatively low resistance to movement along the ground. Many such vehicles 10 also include an occupant cabin 14 that is mounted to the frame structures 11 of the vehicle 10. Many such vehicles 10 also include a fuel-level-detection system 17 for detecting how much fuel 34 is present in the fuel reservoir 16 and providing an occupant of the occupant cabin 14 with an indication of the amount of fuel 34 in the fuel reservoir 16. Fuel-level-detection systems 17 of vehicles 10 include a fuel-level sensor 33 that is mounted at least partially within the fuel reservoir 16 and that produces a raw fuel-level signal the characteristics of which are dependent upon the amount of fuel 34 in the fuel reservoir 16. Such fuel-level-detection systems 17 also comprise a fuel-level indicator 20 that is mounted in the occupant cabin 14, and that receives either the raw fuel-level signals from the fuel-level sensor 33 or processed fuel-level signals derived from those raw fuel-level signals. The fuel-level indicator 20 functions in a manner dependent upon the characteristics of the raw or processed fuel-level signals it receives to indicate to an occupant of the occupant cabin 14 the amount of fuel present in the fuel reservoir 16. The present invention relates in particular to fuel-level detection systems 17 that include a fuel-level-signal-translating system 21 that communicatively links the fuel-level sensor 33 and the fuel-level indicator 20 and that converts raw fuel-level signals from the fuel-level sensor 33 into processed fuel-level signals that are transmitted to the fuel-level indicator 20. In particular, the present invention relates to fuel-level-signal-translating systems 21 that have signal-conversion logic that is embodied at least partially in software and in some case also in hardware and according to which the fuel-level-signal-translating system 21 translates raw fuel-level signals from the fuel-level sensor 33 into processed fuel-level signals that are sent to the fuel-level indicator 20.

The present invention relates to vehicles 10 that utilize any known and/or future-conceived type of fuel-level sensor 33. One type of fuel-level sensor 33 that proves to be appropriate in many cases is a wave-reflection type distance sensor. A wave-reflection type distance sensor being a sensor that directs an energy wave such as a sound wave, a light wave, an infrared wave, or some other type of electromagnetic wave and senses the characteristics, return time, or return orientation or position of the energy wave(s) reflected from nearby objects in order to determine the distance from the wave-reflection type sensor to those nearby objects. Many different constructions of wave-reflection type distance sensors are well known and, accordingly, the details of construction of such sensors will not be discussed herein. Generally, as is the case in FIGS. 1 and 2, a wave-reflection type distance sensor employed as a fuel-level sensor 33 in a vehicle 10 would be mounted at least partially within a fuel reservoir 16 in such an orientation that the energy waves it generates are reflected off of the upper surface of the fuel 34, or the bottom of the fuel reservoir 16 when it is empty, and back to the wave-reflection type distance sensor that is the fuel-level sensor 33. In most cases, including the one illustrated in FIGS. 1 and 2, such a wave-reflection type distance sensor that is a fuel-level sensor 33 would be mounted in an upper portion of the fuel reservoir 16 and would direct its generated energy waves downwardly toward the fuel. It is, however, anticipated that a person of ordinary skill in the art could readily work out the details necessary to enable mounting of a wave-reflection type distance sensor in many other locations and orientations in a fuel reservoir 16 in order to enable sensing of the fuel level in the fuel reservoir 16.

The hardware of a fuel-level-signal-translating system 21, to which the present invention relates, may be constructed and interacted with the fuel-level sensor 33 and the fuel-level indicator 20 in any of a number of different ways. In a fuel-level-signal-translating system 21 the hardware that performs signal conversions may be physically distributed in any of a number of different ways. In some cases some or all of this hardware will be physically located in the same structure as the fuel-level sensor 33. In some cases, such as those shown in FIGS. 1 and 2, some or all of the hardware that performs signal-conversion will be located remote from both the fuel-level sensor 33 and the fuel-level indicator 20. In some cases, some or all of the hardware that performs signal conversion will be located within the same structure as the fuel-level indicator 20.

One aspect of some embodiments of the present invention is/are novel fuel-level-detection calibration methods for calibrating the signal-conversion logic of a fuel-level-signal translating system 20 of a vehicle 10. Various elements of fuel-level-detection calibration methods according to the present invention are described below. A fuel-level-detection calibration method according to the present invention may be executed by an individual, one or more computer(s) on the vehicle 10, and/or one or more computer(s) that are not mounted to the vehicle 10.

In some embodiments, the present invention includes a fuel-level-detection calibration method for calibrating the signal-conversion logic of the fuel-level-signal-translating system 21 wherein the method includes a novel way of determining the characteristics of a raw fuel-level signal that corresponds to an empty state of the fuel reservoir 16. In such embodiments of the present invention, when it is known that the fuel-reservoir 16 is empty, the fuel-level sensor 33 is activated to produce a raw fuel-level signal that is thereafter known to correspond to an empty state of the fuel reservoir 16. In such embodiments, the fuel-level-detection calibration method further includes configuring the signal-conversion logic of the fuel-level-signal-translating system 21 in a manner that is dependent upon the characteristics of the raw fuel-level signal that was generated by the fuel-level sensor 33 at a time when the fuel reservoir 16 was known to be empty and that is known, therefore, to correspond to an empty state of the fuel reservoir 16. There are a number of different ways in which the characteristics of a raw fuel-level signal that is known to correspond to an empty state of the fuel reservoir 16 may be advantageously used in the process of configuring the signal-conversion logic of the fuel-level-signal-translating system 21. One such way is in setting the signal-conversion logic such that, when a raw fuel-level signal that has characteristics equal to those of the raw fuel-level signal that was generated when the fuel reservoir 16 was known to be empty is received by the fuel-level-signal-translating system 21, the fuel-level-signal-translating system 21 will generate a processed fuel-level signal that will cause the fuel-level indicator 20 to indicate an empty state of the fuel reservoir 16. For instance, it may be known that a processed fuel-level signal of 4 volts will cause the fuel-level indicator 20 to indicate an empty state of the fuel reservoir 16, but at the same time it may be unknown what raw fuel-level signal the fuel-level sensor 33 will generate when the fuel reservoir 16 has an empty state. The above-described method may be utilized in such a situation to calibrate the signal-conversion logic of the fuel-level-signal-translating system. According to the above-described method then, if, through activation of the fuel-level sensor 33 at a time when the fuel reservoir 16 was known to be empty, it were determined that a raw fuel-level signal of 2 volts corresponds to an empty state of the fuel reservoir 16, the signal-conversion logic would then be configured such that when a raw fuel-level signal of 2 volts is generated the fuel-level-signal-translating system 21 would translate it into a processed fuel-level signal of 4 volts in order to cause the fuel-level indicator 20 to accurately indicate an empty state of the fuel reservoir 16. Another way in which the discovery of the characteristics of a raw fuel-level signal that corresponds to an empty state of the fuel reservoir 16 may be utilized is in configuring the signal-conversion logic such that processed fuel-level signals that are produced when the fuel reservoir has a state between empty and full are appropriate to cause the fuel-level indicator 20 to provide an appropriate indication of the fill level of the fuel reservoir 16. For instance, some cases the appropriate relationships between possible raw fuel-level signals and processed fuel-level signals may be known as a function of the characteristics of the raw fuel-level signal that corresponds to a full fuel reservoir 16 and the raw fuel-level signal that corresponds to an empty fuel reservoir 16. For instance, an appropriate mathematical relationship between raw fuel-level signals and processed fuel-level signals may have as factors the value of raw fuel-level signal that corresponds to an empty fuel reservoir 16, the value of raw fuel-level signal that corresponds to a full fuel reservoir 16, the value of processed fuel-level signal that will cause an empty fuel reservoir indication, and the value of processed fuel-level signal that will cause a full fuel reservoir indication. In such a case, if all other factors are known, the above-described method may be used to determine the value of raw fuel-level signal that corresponds to an empty fuel reservoir and to thereafter configure the signal-conversion logic with the appropriate mathematical relationship between raw fuel-level signals and processed fuel-level signals. For instance, it may be known that the processed fuel-level signal should vary linearly between the value thereof that will cause an empty fuel reservoir indication and the value thereof that will cause a full fuel reservoir indication as the raw fuel-level signal varies linearly between the value thereof that corresponds to an empty fuel reservoir 16 and the value thereof that corresponds to a full fuel reservoir 16. In equation form one such relationship would be expressed as:

$$\mathrm{pr\_sig\_act} - \mathrm{pr\_sig\_empt} = \frac{(\mathrm{raw\_sig\_act} - \mathrm{raw\_sig\_empt})(\mathrm{pr\_sig\_full} - \mathrm{pr\_sig\_empt})}{(\mathrm{raw\_sig\_full} - \mathrm{raw\_sig\_empt})}$$

Where pr_sig_empt is the value of the processed fuel-level signal that causes an empty fuel reservoir indication, pr_sig_full is the value of the processed fuel-level signal that causes a full fuel reservoir indication, raw_sig_empt is the value of the raw fuel-level signal that corresponds to an empty fuel reservoir 16, raw_sig_full is the value of the raw fuel-level signal that corresponds to a full fuel reservoir 16, and pr_sig_act is the processed fuel-level signal that is to be generated when a given raw fuel-level signal—raw_sig_act—is received. As will be understood by a person of ordinary skill in the art it would not be an uncommon situation, as a result of knowing various aspects of the configuration of the fuel-level-detection system 17, to know the value of all variables in the above-listed equation with the exception of the value of the raw_sig_empt variable. In such a situation, the above-described method could be advantageously used to determine the value of the raw_sig_empt variable and consequently the appropriate mathematical relationship between raw fuel-level signals and processed-fuel level signals. A person could then configure the signal-conversion logic to effect the proper mathematical relationship between raw fuel-level signals and processed fuel-level signals. It should be understood that the above-listed example has been provided only to illustrate how the above-described method could be used to configure the signal-conversion logic and that the proper mathematical relationship between raw fuel-level signals and processed fuel-level signals may have many other forms including non-linear and/or inversely proportional dependent upon the configuration of the fuel reservoir 16 and the fuel-level detection system 17.

As was mentioned above, in some embodiments the present invention includes a method of activating the fuel-level sensor 33 to produce a raw fuel-level signal when it is known that the fuel reservoir 16 is empty and to thereafter calibrate the signal-conversion logic of the fuel-level-signal-translating system 21 in a manner dependent upon the characteristics of the raw fuel-level signal generated when the fuel reservoir 16 is empty. In cases where the fuel-level sensor 33 is a wave-reflection type distance sensor, when such a method is executed the fuel-level sensor 33 would be sensing the distance to the bottom of the fuel reservoir 16. Use of a wave-reflection type distance sensor as a fuel-level sensor 33 in combination with the above-described method of calibrating signal-conversion logic advantageously enables the usage of the same hardware in fuel-level-detection systems 20 for use with many different types of fuel reservoirs 16. This is so because a wave-reflection type distance sensor can sense the level of fuel 34 in a fuel reservoir 16 of virtually any size or shape and the above-described method can be used to properly calibrate the signal-conversion logic of a fuel-level-signal-translating system 21 for a fuel reservoir 16 of virtually any size or shape.

The above-described portions of a fuel-level-detection calibration method in which the characteristics of a raw fuel-level signal that corresponds to an empty state of the fuel reservoir 16 are determined and the signal-conversion logic of the fuel-level-signal-translating system 21 is configured in a manner dependent upon the characteristics of that raw fuel-level signal that corresponds to an empty state of the fuel reservoir 16, may be executed either by an individual or by a computer. In either case the executor of the actions must be apprised of an appropriate time to do so, must have information about how the signal-conversion logic should be appropriately configured dependent upon the characteristics of the raw fuel-level signal that corresponds to an empty state of the fuel reservoir 16, and must be apprised of the actions necessary to determine the characteristics of a raw fuel-level signal that corresponds to an empty state of the fuel reservoir 16 and also the actions that must be taken in order to configure the signal-conversion logic. A person of ordinary skill in the art of constructing fuel-level detection systems 17 could easily figure out all of this information in order to manually perform the above-described steps of a fuel-level-detection calibration method. Such a person could also, with the assistance of a person of ordinary skill in the art of configuring data-processing systems, readily construct and implement in computer memory of a computer, fuel-level-detection calibration logic that includes all such information and logic for causing the computer to utilize it to perform the above-described steps of a fuel-level-detection calibration method.

In some embodiments the present invention includes a fuel-level-detection calibration method that utilizes a database of multiple sets of signal-conversion logic each of which is tailored for use with a particular configuration or group of configurations of vehicle. In such embodiments, the fuel-level-detection calibration method includes receiving and/or determining information about the configuration of the vehicle 10, choosing an appropriate set of signal-conversion logic from the database of multiple sets thereof, and integrating that appropriate set of signal-conversion logic in the fuel-level detection system 17. Utilizing such a database of multiple sets of signal-conversion logic tailored for different vehicle configurations advantageously allows an individual to quickly and easily properly configure the signal-conversion logic of vehicles 10 with numerous different constructions. Of course it will be understood that each of the multiple sets of signal-conversion logic included in a database of multiple sets thereof according to the present invention may vary in scope from a small segment of signal conversion logic that will make up only a fraction of the total signal-conversion logic of the fuel-level-signal-translating system 21 to a comprehensive set of signal-conversion logic for the fuel-level-signal translating system 21. Accordingly, during a fuel-level-detection calibration method there may be one or multiple sets of signal-conversion logic selected and integrated into the fuel-level-signal-translating system 21.

In embodiments of the present invention that include a fuel-level-detection calibration method wherein an appropriate set of signal-conversion logic is chosen from a database of multiple sets thereof based upon information about the configuration of the vehicle 10 the information about the configuration of the vehicle 10 may be received and/or determined through any number of different means. In some embodiments, information about the configuration of a vehicle 10 will be received as part of line-set data for an assembly-line vehicle-construction process. Such line-set data is a listing of vehicle-configuration information for a series of vehicles that are to be built on an assembly line. Line-set data may be received and utilized by an executor of a fuel-level-detection calibration method in any of a number of different forms. If the executor of a fuel-level-detection calibration method is a person, the line-set data may be transmitted to them as a print-out or a display on a display screen. In cases where the executor of a fuel-level-detection calibration method is a computer, the computer may receive the line-set data from any of a number of computer useable data transmitting and/or storage mediums. In embodiments wherein line-set data is transmitted to a computer that will use that line set data to determine an appropriate set of signal-conversion logic to integrate into the fuel-level-signal-translating system of a vehicle 10, well-known methods can be used for apprising the computer of which one of the series of vehicles described by the line-set data the computer is interfaced with at any given point in time and extracting the appropriate vehicle-configuration information from the line-set data.

As was alluded to above, in some embodiments a fuel-level-detection calibration method according to the present invention includes a step of determining information about the configuration of a vehicle 10 before selecting an appropriate set of signal-conversion logic for integration into the fuel-level-signal-translating system 21. Such embodiments can be readily implemented in cases where the fuel-level sensor 33 of a vehicle 10 is a wave-reflection type distance sensor. In such embodiments the wave-reflection type distance sensor that is the fuel-level sensor 33 may be activated to produce a raw fuel-level signal when it is known that the fuel reservoir 16 is empty to produce a raw fuel-level signal that corresponds to an empty state of the fuel reservoir. Subsequently, the characteristics of the resulting raw fuel-level signal that corresponds to an empty state of the fuel reservoir may be used in combination with known information about the characteristics of raw fuel-level signals that correspond the empty states of different fuel reservoirs 16 in order to determine information about the type of fuel reservoir 16 the vehicle 10 has. In cases where such a method is executed primarily manually by an individual, the known information about the characteristics of raw fuel-level signals that correspond to empty states of different types of fuel reservoirs may be known to the executor or it may be stored in any of a number of different media that the executor may readily access. In cases where such a method is executed primarily by one or more computer(s) operating according to fuel-level-detection calibration logic, such known information about the characteristics of raw fuel-level signals that correspond to empty states of different types of fuel reservoirs may be stored in computer memory of one or more of those computer(s) executing the fuel-level-detection calibration method and/or one or more computer(s) communicatively linked thereto. In particular, a fuel-level-detection calibration method that includes activating a wave-reflection type distance sensor that is a fuel-level sensor 33 to produce a raw fuel-level signal that corresponds to an empty state of the fuel reservoir 16 could be used to determine the size of a fuel reservoir 16, which would, in many cases, have significant bearing on which set(s) of signal-conversion logic should be integrated into the fuel-level-signal translating system 20. For instance, it may be known that a particular type and application of a wave-reflection type distance sensor that is a fuel-level sensor 33 may generate a 5–6 volt raw fuel-level signal when activated in an empty 20 inch fuel reservoir and it may further be known that the same type and application of fuel-level sensor 33 would generated a raw fuel-level signal of 8–9 volts when activated in an empty 24 inch fuel reservoir. In such a circumstance, the fuel-level sensor 33 may be activated when the fuel reservoir is empty and dependent upon whether the raw fuel-level signal generated is 5–6 volts or 8–9 volts signal-conversion logic that is appropriate for a 20 inch or a 24 inch fuel reservoir may be selected and integrated into the signal-conversion logic of the fuel-level-signal translating system 21.

In some embodiments, the present invention includes fuel-level-detection calibration logic that is operable to cause a computer to execute one or more of the steps of the various embodiments of the above-described fuel-level-detection calibration methods. In such embodiments the fuel-level-detection calibration logic may be disposed in computer memory of one or more computer(s) 23 of a vehicle 10 that are communicatively linked to and/or are part of the fuel-level-detection system 17 of the vehicle 10 and those computer(s) 23 may be caused to perform one or more of the steps of the various embodiments of the above-described fuel-level-detection calibration methods to configure the signal-conversion logic of the fuel level-detection system 17 of the vehicle 10. In some such embodiments the computer(s) 23 that are operable according to the fuel-level-detection calibration logic are part of the fuel-level detection system 17 and actually perform conversion of raw fuel-level signals received from the fuel-level sensor 33 into the processed fuel-level signals communicated to the fuel-level indicator 20. In such cases, the fuel-level detection system 17 is advantageously at least partially self-calibrating. In some embodiments, one or more computer(s) 23 of the vehicle 10, which are operable according to fuel-level-detection calibration logic to configure at least parts of the signal-conversion logic, are also communicatively linked to and control at least parts of the operation of other systems of the vehicle 10 such as controls and gauges of the instrument panel, engine-control computer(s), transmission-control computer(s), and/or anti-lock brake system computer(s). Constructing a vehicle 10 with one or more computer(s) 23 that function to translate raw fuel-level signals into processed fuel-level signals, that is/are self-calibrating, and that also controls aspects of operation of other systems of the vehicle is advantageously cost, time, and space efficient.

Figure 2:
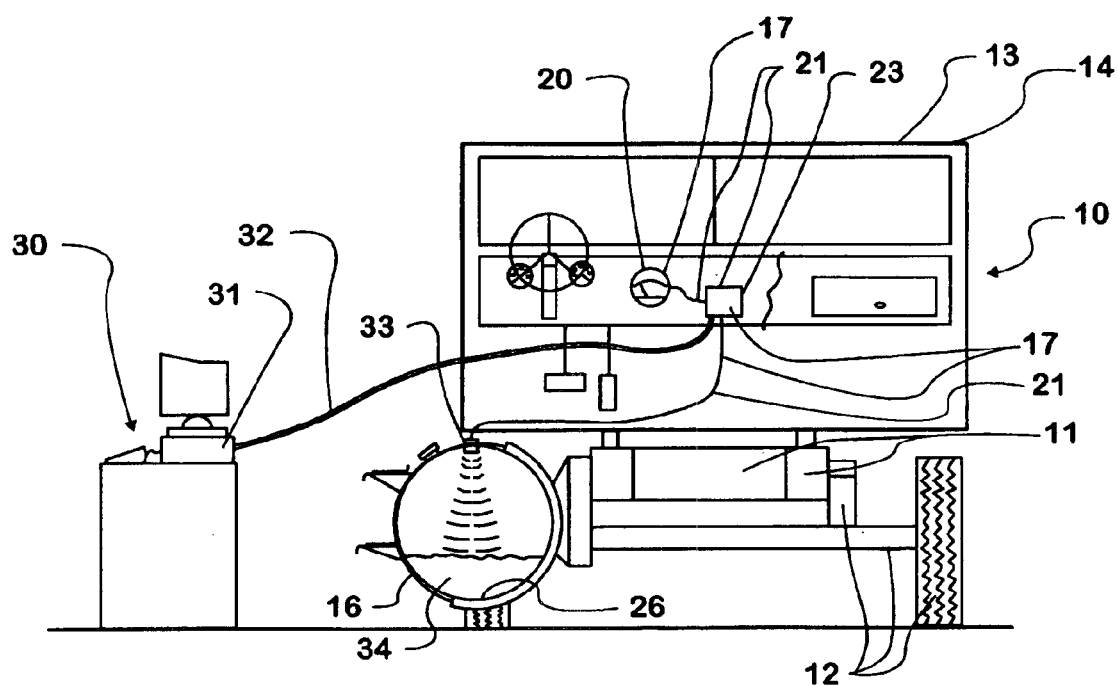
FIG. 2 is a sectional view of a vehicle that the present invention relates to through a plane that intersects the occupant cabin of the vehicle transverse to the longitudinal axis of the vehicle and with a portion of the dash panel cut away and with a vehicle-controller calibration system communicatively connected to the fuel-level-detection system of the vehicle.

In some embodiments, such as the one shown in FIG. 2, the present invention comprises a vehicle-controller calibration system 30 that is separate from a vehicle 10 and that is constructed to execute one or more portions of the above-described fuel-level-detection calibration method. In such embodiments, the vehicle-controller calibration system 30 includes one or more vehicle-configuration computer(s) 31 that have stored in their computer memory fuel-level-detection calibration logic that is operable to cause them to execute one or more of the portions of the above-described fuel-level-detection calibration method. Such a vehicle-controller calibration system 30 also includes communicative linkages 32 through which the vehicle-configuration computer(s) 31 may be communicatively linked to the fuel-level-signal-translating system 21. In some embodiments such a vehicle-controller calibration system 30 is stationed adjacent an assembly line for calibrating the vehicle-controllers of vehicles 10 as they are constructed on the assembly line. In some such embodiments the vehicle-configuration computer(s) 31 have loaded in their computer memory a database of multiple sets of signal-conversion logic each of which is appropriate for a different vehicle configuration or group of vehicle configurations. In some such embodiments the fuel-level-detection calibration logic according to which the vehicle-configuration computer(s) 31 are operable causes the vehicle-configuration computer(s) 31 to receive and/or determine information about the configuration of a vehicle 10, to select an appropriate set of signal-conversion logic based on this received and/or determined configuration information, and to integrate that appropriate set of signal-conversion logic into the fuel-level-signal translating system 21 of the fuel-level detection system 17. In some such embodiments the vehicle-configuration computer(s) 31, the general operating logic thereof, and the fuel-level-detection calibration logic are configured in such a manner to cause the vehicle-configuration computer(s) 31 to receive the information about the configuration of a vehicle 10 in the form of electronic line-set data which is electronic data that is understandable to the vehicle-configuration computer(s) 31 as a list of characteristics of a series of vehicles that are to be built on the assembly line. As was mentioned above, conventional provisions may be included in the vehicle-controller configuration system 30 for enabling it to receive line-set data and utilize that line-set data to ascertain the configuration of a particular vehicle 10 that the vehicle-controller configuration system 30 is communicatively linked to at a particular juncture and to ascertain from the line-set data those elements of the vehicle's configuration that affect selection of appropriate signal-conversion logic. Such a vehicle-controller calibration system 30 operable in such a manner advantageously enables quick and easy configuration of the signal-conversion logic of the fuel-level-signal-translating system of multiple vehicles with multiple different configurations, as they are assembled on an assembly line.

In embodiments of the present invention that include a database of multiple sets of signal-conversion logic each of which is adapted for a different vehicle configuration or group of vehicle configurations, there are many different aspects of the vehicle configuration for which each set of signal-conversion logic is appropriate that affect the appropriate constitution of that set of signal-conversion logic. These aspects of the vehicle configuration include, but are not limited to, the type of fuel-level sensor 33, the type of fuel-level indicator 20, various details of construction of the fuel-level-signal-translating system 21 and the size and shape of the fuel reservoir 16. In many cases the fuel-level sensor 33 of a vehicle 10 is constructed in such a manner that it produces a raw fuel-level signal that is linearly related to the height of fuel 34 in the fuel reservoir 16. Also, in many cases, the fuel-level indicator 20 of a vehicle 10 may be constructed in such a manner that it indicates the fuel level in the fuel reservoir 16 as a percentage of a full fill level of the fuel reservoir 16 in a manner that is linearly related to the value of the signal it receives. As a result, if such a fuel-level indicator 20 receives signals that are linearly height-dependent raw fuel-level signals or simply scaled products thereof, the fuel-level indicator 20 will indicate the fill level of the fuel-reservoir 16 as a ratio of the height of the fuel 34 in the fuel reservoir 16 compared to the depth of the fuel reservoir 16. In many circumstances it is desirable for the fuel-level indicator 20 to indicate the fill level of the fuel reservoir 16 as a ratio of the volume of fuel 34 in the fuel reservoir 16 as compared to the volume of the fuel reservoir 16. Additionally, in most cases fuel reservoirs 16 are of such a shape that the volume of fuel 34 in the fuel reservoir 16 does not vary linearly with the height of the fuel 34 in the fuel reservoir 16. The present invention includes provisions for producing a volume-dependent fuel fill level indication to an occupant using a fuel-level indicator 20 that indicates fuel fill level in a manner that is linearly dependent upon the value of the signals it receives and a fuel-level sensor 33 that produces raw fuel-level signals that are linearly dependent upon the height of fuel in the fuel reservoir 16. These provisions of the present invention include signal-conversion logic that includes equations and/or look-up tables that convert raw fuel-level signals that are linearly dependent upon the height of fuel 34 in the fuel reservoir 16 into processed fuel-level signals that are linearly dependent upon the volume of fuel in the fuel reservoir 16. For example, FIG. 3 contains a look-up table useable to convert linearly height-dependent raw fuel-level signals into linearly volume-dependent processed fuel-level signals for cylindrical fuel reservoirs 16 that have their longitudinal axis disposed horizontally as is shown in FIGS. 1 and 2. In many embodiments of the present invention a database of multiple sets of signal-conversion logic includes multiple different sets of signal-conversion logic that include equations and/or look-up tables for use in translating linearly height-dependent raw fuel-level signals into linearly volume-dependent fuel-level signals for different types of fuel reservoirs 16. For instance, a database of multiple sets of signal-conversion logic may include a set signal conversion logic for each of 20 inch cylindrical, 22 inch cylindrical, 24 inch cylindrical, 20 inch D-shaped, 22 inch D-shaped, and 24 inch D-shaped fuel reservoirs 16. In such a case the set of signal-conversion logic for each of the different types of fuel reservoir 16 may include look-up tables and/or equations for converting linearly height-dependent raw fuel-level signals into linearly volume-dependent processed fuel-level signals. Embodiments of the present invention that include a database with multiple sets of signal-conversion logic that include look-up tables and/or equations for height-dependent to volume-dependent signal translation generally further include a method of receiving and/or determining information about the type of fuel reservoir 16 that a vehicle 10 has, selecting an appropriate set of signal-conversion logic for converting linearly height-dependent raw fuel-level signals into linearly volume-dependent processed fuel-level signals for that type of fuel reservoir 16, and integrating that appropriate set of signal-conversion logic into the fuel-level-signal-translating system 21 of the vehicle 10. In some such embodiments the present invention also includes a vehicle-controller calibration system 30 with fuel-level-detection calibration logic that causes it to receive information about the type of fuel reservoir 16 a particular vehicle 10 has, select from a database of multiple sets of signal-conversion logic an appropriate set of signal-conversion logic for converting linearly height-dependent raw fuel-level signals into linearly volume-dependent processed fuel-level signals for that type of fuel reservoir 16, and integrate that appropriate set of signal-conversion logic into the fuel-level-signal translating system 21. Many embodiments of the present invention also include a vehicle 10 with a fuel-level detection system 17 that includes signal-conversion logic for converting raw fuel-level signals that are linearly dependent upon the height of fuel 34 in the fuel reservoir 16 into processed fuel-level signals that are linearly dependent upon the volume of fuel 34 in the fuel reservoir 16 of the vehicle 10.

It will, of course, be understood that embodiments of the present invention may take on any of a number of different forms within the guidelines set forth above and that some features of the invention could be employed without a corresponding use of other features.

We claim:

1. A vehicle, comprising:

(a) one or more rigid and strong frame structures to which a majority of other components of said vehicle are directly or indirectly engaged and from which a majority of other components of said vehicle derive support directly or indirectly;

(b) a suspension system that is engaged to and supports said one or more frame structures above the ground and that provides the vehicle with a relatively low resistance to movement along the ground;

(c) one or more body structures including an occupant cabin that is/are engaged to and supported by said one or more frame structures and within which occupants and/or cargo of said vehicle may reside;

(d) a powerplant that is mounted to said frame structures and that is operable to provide power to drive said vehicle;

(e) a fuel reservoir that is mounted directly or indirectly to said frame structures and/or said body structures of said vehicle, and within which fuel may be stored for consumption by said powerplant;

(f) a fuel-level detection system;

(g) wherein said fuel-level detection system comprises a fuel-level sensor mounted in said fuel reservoir;

(h) wherein said fuel-level detection system comprises a fuel-level indicator that is mounted in said occupant cabin;

(i) wherein said fuel-level detection system further comprises a fuel-level-signal-translating system that communicatively links said fuel-level sensor and said fuel-level indicator;

(j) wherein said fuel-level-signal-translating system receives raw fuel-level signals from said fuel-level sensor and translates them into processed fuel-level signals that are communicated to said fuel-level indicator;

(k) wherein said vehicle further comprises one or more computer(s) that are either communicatively linked to or are part of said fuel-level-signal-translating system and that are also communicatively linked to said fuel-level sensor;

(l) fuel-level-detection calibration logic, which is embodied in hardware and/or software of said one or more computer(s) and that may be activated when said fuel reservoir is empty to cause said one or more computer(s) to perform a fuel-level-detection calibration method which comprises the steps of:

activating said fuel-level sensor and causing it to produce a raw fuel-level signal that corresponds to an empty state of said liquid-fuel tank; and configuring signal-conversion logic of said fuel-level-signal-translating system in a manner dependent upon the characteristics of said raw fuel-level signal that corresponds to an empty state of said fuel-reservoir;

said one or more computer(s) configuring said signal-conversion logic of said fuel-level-signal-translating system in a manner such that, thereafter, a raw fuel-level signal with characteristics equal to said raw fuel-level signal that corresponds to said empty state of said fuel reservoir will be translated into a processed fuel-level signal that will cause said fuel-level indicator to indicate an empty stats of said fuel-reservoir;

(m) said fuel-level sensor and said fuel-level-signal-translating system are constructed in such a manner that said raw fuel-level signals and/or intermediate signals have values that are linearly related to a height of fuel in said fuel reservoir;

(n) said fuel-level-detection calibration logic is configured such that it causes said computer(s) to perform the step of:

integrating into said fuel-level-signal-translating system signal-conversion look-up tables and/or equations that convert said raw fuel-level signals or intermediate signals that are linearly related to said height of said fuel in said fuel reservoir into processed fuel-level signals that are linearly related to a volume of fuel in said fuel reservoir.

2. The vehicle of claim 1, wherein:
(o) said one or more computer(s) that are operable to execute said fuel-level detection calibration method are also communicatively linked to and perform control of other systems of said vehicle in addition to said fuel-level detection system.

3. The vehicle of claim 2, wherein:
(p) one or more of said one or more computer(s) that are operable to perform said fuel-level detection calibration method are part of said fuel-level-signal-translating system.

4. The vehicle of claim 3, wherein:
(q) said fuel-level sensor is a wave-reflection type distance sensor that is mounted in an upper portion of said fuel reservoir; and
(r) when said fuel-level sensor is activated when said fuel reservoir is empty it senses a downward distance to a bottom of said fuel reservoir.

5. The vehicle of claim 1, wherein:
(o) said fuel-level sensor is a wave-reflection type distance sensor that is mounted in an upper portion of said fuel reservoir; and
(p) when said fuel-level sensor is activated when said fuel reservoir is empty it senses a downward distance to a bottom of said fuel reservoir.

6. A vehicle, comprising:
(a) one or more rigid and strong frame structures to which a majority of other components of said vehicle are directly or indirectly engaged and from which a majority of other components of said vehicle derive support directly or indirectly;
(b) a suspension system that is engaged to and supports said one or more frame structures above the ground and that provides the vehicle with a relatively low resistance to movement along the ground;
(c) one or more body structures including an occupant cabin that is/are engaged to and supported by said one or more frame structures and within which occupants and/or cargo of said vehicle may reside;

(d) a powerplant that is mounted to said frame structures and that is operable to provide power to drive said vehicle;
(e) a fuel reservoir that is mounted directly or indirectly to said frame structures and/or said body structures of said vehicle, and within which fuel may be stored for consumption by said powerplant;
(f) a fuel-level detection system;
(g) wherein said fuel-level detection system comprises a fuel-level sensor that is mounted at least partially within said fuel reservoir and that produces raw fuel-level signals in a manner that is linearly dependent upon a height of fuel in said fuel reservoir;
(h) wherein said fuel-level detection system comprises a fuel-level indicator that is mounted in said occupant cabin;
(i) wherein said fuel-level detection system further comprises a fuel-level-signal-translating system that communicatively links said fuel-level sensor and said fuel-level indicator;
(j) wherein said fuel-level-signal-translating system receives raw fuel-level signals from said fuel-level sensor and translates them into processed fuel-level signals that are communicated to said fuel-level indicator;
(k) said fuel-level sensor and said fuel-level-signal-translating system are constructed in such a manner that said raw fuel-level signals and/or intermediate signals have values that are linearly related to a height of fuel in said fuel reservoir; and
(l) said fuel-level-signal-translating system comprises signal-conversion look-up tables and/or equations that are stored in computer memory of said fuel-level-signal-translating system and that are used to convert said raw fuel-level signals or intermediate signals that are linearly related to said height of said fuel in said fuel reservoir into processed fuel-level signals that are linearly related to a volume of fuel in said fuel reservoir.

7. The vehicle of claim 6, wherein:
(m) said vehicle comprises one or more computer(s) that are part of said fuel-level-signal-translating system and are also communicatively linked to and perform control of other systems of said vehicle.

8. A fuel-level detection calibration method for configuring signal-conversion logic of a fuel-level-signal-translating system of a vehicle with a fuel reservoir with a fuel-level sensor mounted at least partially within said fuel reservoir and which fuel-level sensor is operable to produce raw fuel-level signals in a manner dependent upon the level of fuel in the fuel reservoir and to transmit those raw fuel-level signals to the fuel-level-signal-translating system which operates according to the signal-conversion logic to translate the raw fuel-level signals into processed fuel-level signals that are communicated to a fuel-level indicator in an occupant cabin, said fuel level detection calibration method comprising the steps of:
(a) when said fuel reservoir is empty, activating the fuel-level sensor and thereby causing it to produce a raw fuel-level signal that corresponds to an empty state of the fuel reservoir; and
(b) configuring signal-conversion logic of the fuel-level-signal-translating system in a manner that is dependent upon the characteristics of said raw fuel-level signal that corresponds to an empty state of the fuel reservoir.

9. The fuel-level-detection calibration method of claim 8, wherein:
  (a) said step of configuring signal-conversion logic of the fuel-level-signal-translating system in a manner that is dependent upon the characteristics of said raw fuel-level signal that corresponds to an empty state of the fuel reservoir comprises the step of:
    configuring the signal-conversion logic of the fuel-level-signal-translating system in such a manner that, thereafter, said fuel-level-signal-translating system translates raw fuel-level signals with characteristics equal to said raw fuel-level signal that corresponds to an empty state of the fuel reservoir into processed fuel-level signals that will cause the fuel-level indicator to indicate an empty state of the fuel reservoir.

10. The fuel-level-detection calibration method of claim 9, wherein:
  (a) configuring signal-conversion logic of the fuel-level-signal-translating system further comprises the step of:
    integrating into to said signal-conversion logic look-up tables and/or equations that said fuel-level-signal-translating system will use to translate raw fuel-level signals and/or intermediate signals that are linearly related to a height of fuel in the fuel reservoir into processed fuel-level signals that are linearly related to a volume of fuel in the fuel reservoir.

11. The fuel-level-detection calibration method of claim 10, wherein:
  (a) configuring signal-conversion logic of the fuel-level-signal-translating system further comprises the step of:
    prior to integrating said look-up tables and/or equations into said signal-conversion logic, receiving and/or determining information about the type of fuel reservoir that the vehicle has and selecting, from a database of multiple sets of signal-conversion logic that comprise look-up tables and/or equations for different types of fuel-reservoirs, appropriate look-up tables and/or equations for the type of fuel reservoir the vehicle has for integration into said signal-conversion logic.

12. The fuel-level-detection calibration method of claim 11, wherein:
  (a) said fuel-level-detection calibration method is executed during assembly of the vehicle in an assembly-line process;
  (b) said fuel-level-detection calibration method is executed, when commanded to do so, by a vehicle-controller calibration system at an assembly line on which the vehicle is being assembled;
  (c) said database of multiple sets of signal-conversion logic with look-up tables and/or equations for different types of fuel reservoirs is stored in computer memory of the vehicle-controller calibration system; and
  (d) wherein said information about the type of fuel reservoir the vehicle has is part of line-set data that includes vehicle configuration information about each of a series of vehicles that is to be built on the assembly line.

13. The fuel-level-detection calibration method of claim 11, wherein:
  (a) the fuel-level sensor of the vehicle is a wave-reflection type distance sensor; and
  (b) said step of receiving and/or determining information about the type of fuel reservoir the vehicle has includes utilizing the characteristics of said raw fuel-level signal that corresponds to an empty state of the fuel reservoir in combination with known information about characteristics of such raw fuel-level signals that correspond to empty states of different types of fuel reservoirs to determine information about what type of fuel reservoir the vehicle has.

14. A fuel-level-detection calibration method for configuring signal-conversion logic of a fuel-level-signal-translating system of a vehicle with a fuel reservoir with a fuel-level sensor mounted at least partially within said fuel reservoir and which fuel-level sensor is operable to produce raw fuel-level signals in a manner dependent upon the level of fuel in the fuel reservoir and to transmit those raw fuel-level signals to the fuel-level-signal-translating system which operates according to the signal-conversion logic to translate the raw fuel-level signals into processed fuel-level signals that are communicated to a fuel-level indicator in an occupant cabin, said fuel-level detection calibration method comprising the steps of:
  (a) receiving and/or determining information about the configuration of the vehicle and selecting, from a database of multiple sets of signal-conversion logic, signal-conversion logic that is appropriate for the configuration of the vehicle;
  (b) integrating into the fuel-level-signal-translating system said set of signal-conversion logic that is appropriate for the configuration of the vehicle;
  (c) said fuel-level-detection calibration method is executed during assembly of the vehicle in an assembly-line process;
  (d) said fuel-level-detection calibration method is executed, when commanded to do so, by a vehicle-controller calibration system at an assembly line on which the vehicle is being assembled;
  (e) said database of multiple sets of signal-conversion logic for different vehicle configurations is stored in computer memory of the vehicle-controller calibration system; and
  (f) wherein said information about the configuration of the vehicle is part of line-set data that includes configuration information about each of a series of vehicles that is to be built on the assembly line.

15. A fuel-level-detection calibration method for configuring signal-conversion logic of a fuel-level-signal-translating system of a vehicle with a fuel reservoir with a fuel-level sensor mounted at least partially within said fuel reservoir and which fuel-level sensor is operable to produce raw fuel-level signals in a manner dependent upon the level of fuel in the fuel reservoir and to transmit those raw fuel-level signals to the fuel-level-signal-translating system which operates according to the signal-conversion logic to translate the raw fuel-level signals into processed fuel-level signals that are communicated to a fuel-level indicator in an occupant cabin, said fuel-level detection calibration method comprising the steps of:
  (a) receiving and/or determining information about the configuration of the vehicle and selecting, from a database of multiple sets of signal-conversion logic, signal-conversion logic that is appropriate for the configuration of the vehicle;
  (b) integrating into the fuel-level-signal-translating system said set of signal-conversion logic that is appropriate for the configuration of the vehicle;
  (c) the fuel-level sensor of the vehicle is a wave-reflection type distance sensor; and
  (d) said step of receiving and/or determining information about the configuration of the vehicle includes activating the fuel-level sensor at a time when the fuel reservoir is empty and utilizing the characteristic of a resulting raw fuel-level signal that corresponds to an empty state of the fuel reservoir in combination with known information about characteristics of such raw fuel-level signals that correspond to empty states of different types of fuel reservoirs to determine information about what type of fuel reservoir the vehicle has.

16. A fuel-level-detection calibration method for configuring signal-conversion logic of a fuel-level-signal-translating system of a vehicle with a fuel reservoir with a fuel-level sensor mounted at least partially within said fuel reservoir and which fuel-level sensor is operable to produce raw fuel-level signals in a manner dependent upon the level of fuel in the fuel reservoir and to transmit those raw fuel-level signals to the fuel-level-signal-translating system which operates according to the signal-conversion logic to translate the raw fuel-level signals into processed fuel-level signals that are communicated to a fuel-level indicator in an occupant cabin, said fuel-level-detection calibration method comprising the steps of:

(a) receiving and/or determining information about the type of fuel reservoir that the vehicle has and selecting, from a database of multiple sets of signal-conversion logic with look-up tables and/or equations for different types of fuel-reservoirs, signal-conversion logic with look-up tables and/or equations that are useable for the type of fuel reservoir the vehicle has to translate raw fuel-level signals and/or intermediate signals that are linearly related to a height of fuel in the fuel reservoir into processed fuel-level signals that are linearly related to a volume of fuel in the fuel reservoir; and (b) integrating into the fuel-level-signal-translating system said signal-conversion logic with said signal-conversion look-up tables and/or equations that are useable for the type of fuel reservoir the vehicle has to translate raw fuel-level signals and/or intermediate signals that are linearly related to a height of fuel in the fuel reservoir into processed fuel-level signals that are linearly related to a volume of fuel in the fuel reservoir.

17. The fuel-level-detection calibration method of claim 16, wherein:

(a) said fuel-level-detection calibration method is executed during assembly of the vehicle in an assembly-line process;

(b) said fuel-level-detection calibration method is executed, when commanded to do so, by a vehicle-controller calibration system at an assembly line on which the vehicle is being assembled;

(c) said database of multiple sets of signal-conversion logic with look-up tables and/or equations for different types of fuel reservoirs is stored in computer memory of the vehicle-controller calibration system; and (d) wherein said information about the type of fuel reservoir the vehicle has is part of line-set data that includes configuration information about each of a series of vehicles that is to be built on the assembly line.

18. The fuel-level-detection calibration method of claim 16, wherein:

(a) the fuel-level sensor of the vehicle is a wave-reflection type distance sensor; and (b) said step of receiving and/or determining information about the type of fuel reservoir the vehicle has includes activating the fuel-level sensor at a time when the fuel reservoir is empty and utilizing the characteristics of a resulting raw fuel-level signal that corresponds to an empty state of the fuel reservoir in combination with known information about characteristics of such raw fuel-level signals that correspond to empty states of different types of fuel reservoirs to determine information about what type of fuel reservoir the vehicle has.

19. A vehicle-controller calibration system for configuring signal-conversion logic of fuel-level-signal translating systems of vehicles with a fuel reservoir with a fuel-level sensor mounted at least partially within said fuel reservoir and which fuel-level sensor is operable to generate raw fuel-level signals in a manner dependent upon the fuel level in the fuel reservoir and to transmit those raw fuel-level signals to the fuel-level-signal-translating system which operates according to the signal-conversion logic to translate the raw fuel-level signals into processed fuel-level signals that are communicated to a fuel-level indicator in an occupant cabin, said vehicle-controller calibration system comprising:

(a) one or more vehicle-configuration computer(s) and commucative linkages for communicatively linking said vehicle-configuration computer(s) to the fuel-level-signal-translating system of the vehicle;

(b) fuel-level-detection calibration logic, which is embodied in hardware and/or software of said one or more vehicle-configuration computer(s)

(c) wherein said fuel-level-detection calibration logic may be activated when the fuel reservoir is empty to cause said vehicle-configuration computer(s) to perform a fuel-level-detection calibration method which comprises the steps of:

activating the fuel-level sensor and causing it to produce a raw fuel-level signal that corresponds to an empty state of the fuel reservoir;

configuring signal-conversion logic of the fuel-level-signal-translating system in a manner dependent upon the characteristics of said raw fuel-level signal that corresponds to an empty state of the fuel reservoir; and said vehicle-configuration computer(s) configuring said signal-conversion logic of the fuel-level-signal-translating system in a manner such that thereafter, raw fuel-level signals with characteristics equal to said raw fuel-level signal that corresponds to said empty state of said fuel reservoir will be translated into processed fuel-level signals that will cause the fuel-level indicator to indicate an empty state of the fuel-reservoir;

said vehicle-configuration computer(s) integrating into said signal-conversion logic look-up tables and/or equations that the fuel-level-signal-translating system will use to translate raw fuel-level signals and/or intermediate signals that are linearly related to a height of fuel in the fuel reservoir into processed fuel-level signals that are linearly related to a volume of fuel in the fuel reservoir.

20. The vehicle-controller calibration system of claim 19, wherein:

(d) said vehicle-controller calibration system includes, in computer memory of said vehicle-configuration computer(s), a database of multiple sets of signal-conversion logic with look-up tables and/or equations for converting linearly height-related raw fuel-level signals into linearly volume-related processed fuel-level signals for multiple different types of fuel reservoirs;

(e) said fuel-level-detection calibration logic is configured such that said fuel-level-detection calibration method comprises the step of:
prior to said vehicle-controller configuration system integrating said look-up tables and/or equations into said signal-conversion logic, said vehicle-controller configuration system receiving and/or determining information about the type of fuel reservoir that the vehicle has and selecting, from said database of multiple sets of signal-conversion logic with look-up tables and/or equations for converting linearly height-related raw fuel-level signals into linearly volume-related processed fuel-level signals for different types of fuel-reservoirs, an appropriate set of signal conversion-logic with look-up tables and/or equations for converting linearly height-related raw fuel-level signals into linearly volume-related processed fuel-level signals for the type of fuel reservoir the vehicle has for integration into said signal-conversion logic.

21. The vehicle-controller calibration system of claim 20, wherein:
(f) logic according to which said one or more vehicle-configuration computer(s) is/are operable is such that said step of receiving and/or determining information about which type of fuel reservoir the vehicle has may be accomplished through the receipt by said one or more vehicle-configuration computer(s) of line-set data that includes configuration information about each of a series of vehicles that is to be built on the assembly line.

22. A vehicle-controller calibration system for configuring signal-conversion logic of fuel-level-signal-translating systems of vehicles with a fuel reservoir with a fuel-level sensor mounted at least partially within said fuel reservoir and which fuel-level sensor is operable to sense a fuel level in the fuel reservoir and transmit raw fuel-level signals to the fuel-level-signal-translating system which operates according to the signal-conversion logic to translate the raw fuel-level signals into processed fuel-level signals that are communicated to a fuel-level indicator in an occupant cabin, said vehicle-controller calibration system comprising:
(a) one or more vehicle-configuration computer(s) and communicative linkages for communicatively linking said vehicle-configuration computer(s) to the fuel-level-signal-translating system of the vehicle;
(b) in computer memory of said vehicle-configuration computer(s), a database of multiple different sets of signal-conversion logic which includes sets of signal-conversion logic for plural different vehicle configurations; and
(c) fuel-level-detection calibration logic, which is embodied in hardware and/or software of said one or more vehicle-configuration computer(s) and that may be activated to cause said vehicle-configuration computer(s) to perform a fuel-level-detection calibration method which comprises the steps of:
receiving and/or determining information about the vehicle configuration and selecting, from said database of multiple sets of signal-conversion logic, one or more sets of signal-conversion logic that are appropriate for the vehicle configuration and adding those sets of signal-conversion logic to said fuel-level-signal-translating system.

23. The vehicle-controller calibration system of claim 22, wherein:
(d) logic according to which said one or more vehicle-configuration computer(s) is/are operable is such that said step of receiving and/or determining information about the vehicle configuration may be accomplished through the receipt by said one or more vehicle-configuration computer(s) of line-set data that includes configuration information about each of a series of vehicles that is to be built on an assembly line.

24. The vehicle-controller calibration system of claim 23, wherein:
(e) said database of multiple different sets of signal-conversion logic includes multiple different sets of signal-conversion logic with look-up tables and/or equations for converting raw fuel-level signals that are linearly related to a height of fuel in the fuel reservoir into processed fuel-level signals that are linearly related to a volume of fuel in the fuel reservoir for different types of fuel reservoirs.

25. The vehicle-controller calibration system of claim 22, wherein:
(d) said fuel-level-detection calibration logic is configured in such a manner that in cases where the fuel-level sensor of the vehicle is a wave-reflection type distance sensor said fuel-level-detection calibration logic can cause said vehicle-configuration computer(s) to determine information about the type of fuel reservoir the vehicle has by causing said vehicle-configuration computer(s) to perform the step of:
activating the fuel-level sensor at a time when the fuel reservoir is empty and utilizing the characteristics of a resulting raw fuel-level signal that corresponds to an empty state of the fuel reservoir in combination with information, which is stored in computer memory of said vehicle-configuration computer(s), about known characteristics of raw fuel-level signals that correspond to empty states of different types of fuel reservoir, to determine information about what type of fuel reservoir the vehicle has.

26. The vehicle-controller calibration system of claim 25, wherein:
(e) said database of multiple different sets of signal-conversion logic includes multiple different sets of signal-conversion logic which include look-up tables and/or equations useable for converting raw fuel-level signals that are linearly related to a height of fuel in the fuel reservoir into processed fuel-level signals that are linearly related to a volume of fuel in the fuel reservoir for different types of fuel reservoirs.

27. The vehicle-controller calibration system of claim 22, wherein:
(d) said database of multiple different sets of signal-conversion logic includes multiple different sets of signal-conversion logic which include look-up tables and/or equations useable for converting raw fuel-level signals that are linearly related to a height of fuel in the fuel reservoir into processed fuel-level signals that are linearly related to a volume of fuel in the fuel reservoir for different types of fuel reservoirs.

* * * * *